(12) United States Patent
Witte (10) Patent No.: US 11,554,645 B2
(45) Date of Patent: Jan. 17, 2023

(54) GLARE PREVENTION SYSTEM AND METHOD FOR A VEHICLE

(71) Applicant: Ningbo Geely Automobile Research & Development Co., Ltd., Ningbo (CN)

(72) Inventor: Markus Witte, Torslanda (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 181 days.

(21) Appl. No.: 16/888,756

(22) Filed: May 31, 2020

(65) Prior Publication Data

US 2020/0290439 A1    Sep. 17, 2020

Related U.S. Application Data

(63) Continuation of application No. PCT/CN2018/109907, filed on Oct. 11, 2018.

(30) Foreign Application Priority Data

Dec. 7, 2017 (EP) .................................. 17205878

(51) Int. Cl.
*B60J 3/02* (2006.01)
*B60J 3/04* (2006.01)
*G06V 10/60* (2022.01)
*G06V 20/59* (2022.01)
(Continued)

(52) U.S. Cl.
CPC ............... *B60J 3/0204* (2013.01); *B60J 3/04* (2013.01); *G06V 10/60* (2022.01); *G06V 20/59* (2022.01); *B60Q 1/085* (2013.01); *G06V 40/168* (2022.01)

(58) Field of Classification Search
USPC ...................................... 296/97.1, 97.2, 97.4
See application file for complete search history.

(56) References Cited

U.S. PATENT DOCUMENTS 8,589,034 B2 * 11/2013 Kwok ..................... G02B 27/01
                                                                701/49
10,319,272 B1 * 6/2019 Carter ..................... G06F 3/012
(Continued)

FOREIGN PATENT DOCUMENTS

CN          103158505 A  *  6/2013  ............... B60Q 1/10
CN          103158505 A      6/2013
(Continued)

OTHER PUBLICATIONS

International Search Report from corresponding International Application No. PCT/CN2018/109907, dated Jan. 17, 2019, 5 pages.
(Continued)

*Primary Examiner* — D Glenn Dayoan
*Assistant Examiner* — Kevin P Weldon
(74) *Attorney, Agent, or Firm* — Tucker Ellis LLP (57) ABSTRACT

A system and a method for glare prevention. The method includes providing an image view of the face of the vehicle occupant; determining levels of light at plural parts of the face of the vehicle occupant; determining a direction to a light source causing the levels of light at plural parts of the face of the vehicle occupant; determining an area where to activate a glare protector; and activating the glare protector in the determined area to protect the vehicle occupant from glare caused by a light source.

11 Claims, 5 Drawing Sheets

(51) Int. Cl.
*G06V 40/16* (2022.01)
*B60Q 1/08* (2006.01)

(56) References Cited

U.S. PATENT DOCUMENTS

| | | | |
|---|---|---|---|
| 2005/0131607 A1* | 6/2005 | Breed | B60N 2/0244 |
| | | | 701/45 |
| 2009/0092284 A1 | 4/2009 | Breed | |
| 2020/0133390 A1* | 4/2020 | Patton | G06F 3/013 |

FOREIGN PATENT DOCUMENTS

| | | |
|---|---|---|
| CN | 103273826 A | 9/2013 |
| CN | 105745102 A | 7/2016 |
| DE | 102014220818 A1 | 4/2016 |
| JP | 2009255740 A * | 11/2009 |
| JP | 2012011810 A | 1/2012 |

OTHER PUBLICATIONS

Extended European Search Report from corresponding European Application No. 17205878.6 dated Jun. 18, 2018, 9 pages.
Prokhorov, "Computational Intelligence in Automotive Applications", Jan. 1, 2008, p. 27.
Li; Stan Z, "Handbook of Face Recognition, 2nd ed", Springer, Jan. 1, 2011, pp. 171-184.
Zhao, Wenyi, "Face Processing: Advanced Modeling and Methods", Academic Press, Jan. 1, 2006, pp. 385-424.

* cited by examiner

GLARE PREVENTION SYSTEM AND METHOD FOR A VEHICLE

RELATED APPLICATION DATA

This application is a continuation of International Patent Application No. PCT/CN2018/109907, filed Oct. 11, 2018, which claims the benefit of European Application No. 17205878.6, filed Dec. 7, 2017, the disclosures of which are incorporated herein by reference in their entireties.

TECHNICAL FIELD

The disclosure pertains to the field of light detection and systems and methods for preventing glare in the eyes of a driver of a vehicle.

BACKGROUND

Today it is common for occupants of a vehicle, in particular for the driver of a vehicle, to get dazzled by light in the eyes while driving. Glare can be caused in particularly by the sun, e.g. during sunset and sunrise. Reflections of sunlight can also cause glare. Glare can also be caused by different light sources such as from headlights from other cars. Glare can have a blinding effect on the driver. This can be painful and irritating, and it can also be dangerous and risk and affect the safety of the driving. If the driver cannot see due to the glare, the driver can in a worst case end up in an accident causing death or injury. A natural way to get glare protection is to hold up a hand that shadows the eyes. When driving however both hands need to be occupied with e.g. holding the wheel and changing gear. A common solution today to avoid getting sun glare, and to avoid using the hand of a driver to get the shadow of the eyes, is to use foldable sun visors. These foldable sun visors are often mechanical visors that the driver of the vehicle can pull, or fold down, in front of the driver in order to create some shadow for the eyes and thereby get some glare protection for safer driving.

SUMMARY

Today there is a demand for a better, more convenient, and safer way to prevent glare. An object of the present disclosure is to provide a system and method which seek to mitigate, alleviate, or eliminate one or more of the above-identified deficiencies in the art and disadvantages singly or in any combination.

The disclosure proposes a glare prevention system for a vehicle comprising a camera arranged to provide an image view of a vehicle occupant and a glare protector arranged to at least dampen light from a light source so that the vehicle occupant is less disturbed. The system further comprising a processing circuitry, connected to the camera and the glare protector. The processing circuitry is configured to cause the glare prevention system to provide an image view of the face of the vehicle occupant and determine, based on the image view, different levels of light at plural parts of the face of the vehicle occupant. The processing circuitry is configured to cause the glare prevention system to determine a direction between the face and the light source causing the different levels of light at the plural parts of the face of the vehicle occupant and determine an area where to activate the glare protector and then activate the glare protector in the determined area to protect the vehicle occupant from glare caused by the light source. An advantage with the system is that an occupant of a vehicle, e.g. an operator or a driver of a car, can avoid getting disturbed by glare and this results in a much comfortable, and safe, driving experience.

According to an aspect the processing circuitry is further configured to cause the glare prevention system to determine, based on the image view, a direction of the face of the vehicle occupant in relation to the position of the camera. The knowledge of the direction of the face of the vehicle occupant in relation to the position of the camera is used when determining the area where to activate the glare protector.

According to an aspect, determining the direction between the face and the light comprising comparing the image view of the face of the vehicle occupant with at least one pre-stored image view, wherein the at least one pre-stored image view being associated with a known direction to a known light source causing correlating levels of light at correlating plural parts of a face in the at least one pre-stored image view as the light source is causing to the face of the vehicle occupant in the image view, and assigning the same direction to be the direction to the light source. In other words, the direction between the face and the light source can be determined by utilizing the already existing direction data that is associated with the pre-stored image view that has similar, or correlating parts, of the face with the correlating levels of lights, e.g. the same shadow effects, as the image view of the vehicle occupant. The information about the direction between the face and the light source is used when determining the area where to activate the glare protector.

According to an aspect the glare protector is at least any of a smart window with light blocking segments, a movable curtain or a movable cover element. The glare protector can be any object that is arranged to dampen or block light. This means that the glare protector can be pure electric, electro-mechanic, or mechanic depending on the best suitable design for the vehicle in question and depending on any existing apparatus in the vehicle that can be used by the glare prevention system.

According to an aspect the direction of the face of the vehicle occupant is defined by a three dimensional vector that is perpendicular to a two dimensional plane that is connecting the eyes and the chin of the vehicle occupant. An advantage with defining the direction of the face in this way is that it is easy for a camera to detect the eyes and the chin of a human and also that the line of sight for most humans is within the viewing angle around this vector.

According to an aspect the direction of the face of the vehicle occupant is determined in relation to the position of the camera and/or the at least one glare protector. An advantage with knowing the direction of the face of the vehicle occupant in relation to the camera and/or the at least one glare protector is that the camera and/or the at least one glare protector are/is mounted in the vehicle and hence static.

According to an aspect the level of light at different parts of the face of the vehicle occupant is detected by a light sensor in the camera. The camera captures the light in the face of the vehicle occupant and convert it into electrical signals and this information can be processed by the processing circuitry.

According to an aspect the direction to the light source is relative to the direction of the face of the vehicle occupant. The knowledge of this relation is useful information that can be processed by the processing circuitry when determining the area where to activate the glare protector.

According to an aspect at least one pre-stored image view comprising a digital three dimensional image of a face having correlating levels of light at the correlating plural parts of the face as the face of the vehicle occupant in the image view. An advantage with using a three dimensional image of a face is that the processing of the image view data by the processing circuitry can be more efficient.

According to an aspect the at least one pre-stored image view comprising a three dimensional image of the face of the vehicle occupant having correlating levels of light at the correlating plural parts of the face as the face of the vehicle occupant in the image view. This means that a more precise face data of the specific vehicle occupant can be used for a better determination of the area where to activate the glare protector.

According to an aspect the area where to provide the glare protector in order to protect the vehicle occupant from glare caused by a light source, is determined by using the direction to the light source and the direction of the face of the vehicle occupant in relation to the position of the camera. The knowledge of these relations can be used for better determination of the area where to activate the glare protector.

The disclosure further proposes a method for protecting a vehicle occupant from glare caused by a light source. The method comprising the steps of providing, by a camera, an image view of the face of the vehicle occupant and determining, based on the image view, levels of light at plural parts of the face of the vehicle occupant. This is followed by determining a to a light source causing the levels of light at plural parts of the face of the vehicle occupant and determining an area where to activate a glare protector, and then activating the glare protector in the determined area to protect the vehicle occupant from glare caused by a light source. An advantage with the system is that an occupant of a vehicle, e.g. an operator or a driver of a car, can avoid getting disturbed by glare and this results in a much comfortable, and safe, driving experience.

According to an aspect method further comprising determining, based on the image view, a direction of the face of the vehicle occupant in relation to the position of the camera. The knowledge of the direction of the face of the vehicle occupant in relation to the position of the camera is used when determining the area where to activate the glare protector.

According to an aspect, determining the direction to a light source is achieved by comparing the image view of the face of the vehicle occupant with at least one pre-stored image view, wherein the at least one pre-stored image view being associated with a known direction to a light source causing correlating levels of light at plural parts of a face in the at least one pre-stored image view as the light source is causing to the face of the vehicle occupant in the image view, and assigning the same direction to be the direction to the light source. In other words, the direction between the face and the light source can be determined by utilizing the already existing direction data that is associated with the pre-stored image that has similar, or correlating parts, of the face with the correlating levels of lights, e.g. the same shadow effects, as the image view of the vehicle occupant. The information about the direction between the face and the light source is used when determining the area where to activate the glare protector.

The disclosure further proposes a computer program product comprising a non-transitory computer readable medium, having thereon a computer program comprising program instructions, the computer program being loadable into a data processing unit and configured to cause execution of the method when the computer program is run by the processing circuitry. This means that the method can be transferred or downloaded from the computer readable medium and used in plural devices and/or systems.

BRIEF DESCRIPTION OF THE DRAWINGS

The foregoing will be apparent from the following more particular description of the example aspects, as illustrated in the accompanying drawings in which like reference characters refer to the same parts throughout the different views. The drawings are not necessarily to scale, emphasis instead being placed upon illustrating the example embodiments.

DETAILED DESCRIPTION

Aspects of the present disclosure will be described more fully hereinafter with reference to the accompanying drawings. The method and device disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation. Different aspects can be combined in any combination of two or more aspects.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

Figure 1:
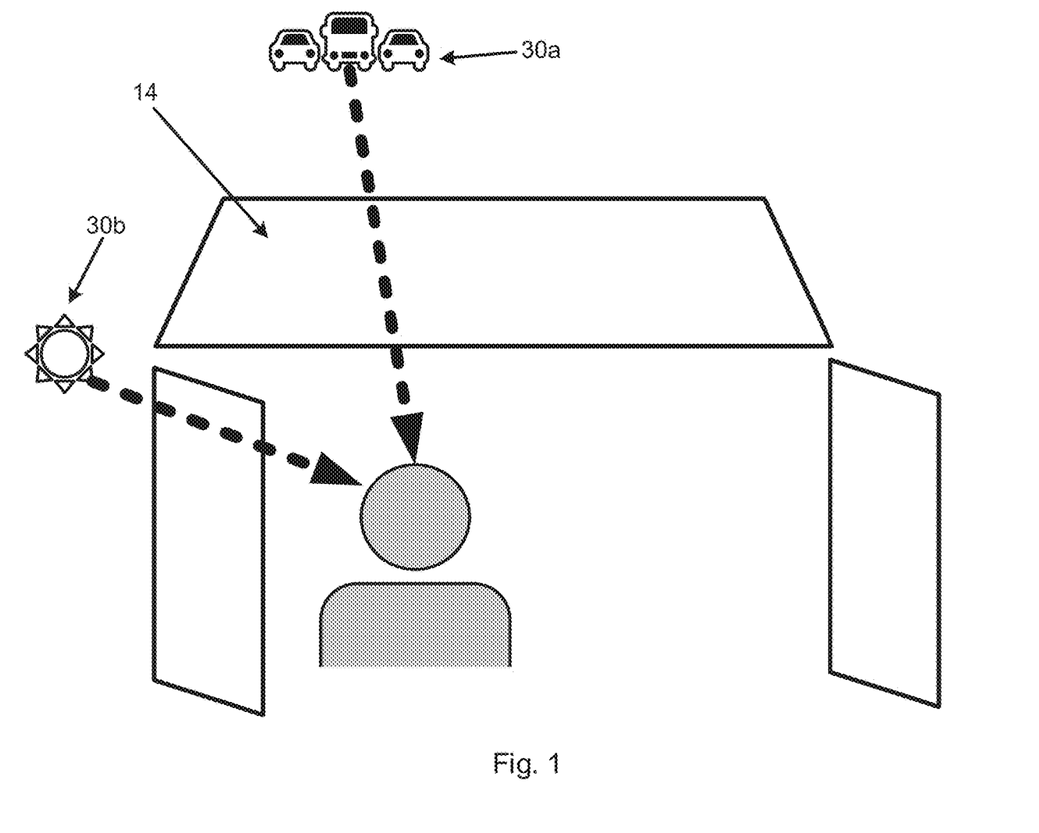
FIG. 1 illustrates glare by light sources that are affecting a driver according to prior art.

Today it is common for occupants of a vehicle, in particular for the driver of a vehicle, to get dazzled by light is the eyes while driving. Glare can be caused in particular by the sun, e.g. during sunset and sunrise, illustrated as 30b in FIG. 1. Reflections of sunlight can also cause glare, e.g. from a wet road or from windows of nearby buildings or other vehicles. Glare can also be caused by different light sources such as from headlights from other cars as illustrated as 30a in FIG. 1. Glare can have a blinding effect on the driver and make the driver less capable of seeing important objects. Glare can be painful and irritating, and it can also be dangerous and risk the safety of the driving. If the driver cannot see due to the glare, the driver can in a worst case end up in an accident causing death or injury. A natural way to get glare protection is to hold up a hand that shadows the eyes.

The inventor has identified that there is a demand for a better, more convenient, and safer way to prevent glare. An object of the present disclosure is to provide a system and method which seek to mitigate, alleviate, or eliminate one or more of the above-identified deficiencies in the art and disadvantages singly or in any combination.

Figure 2:
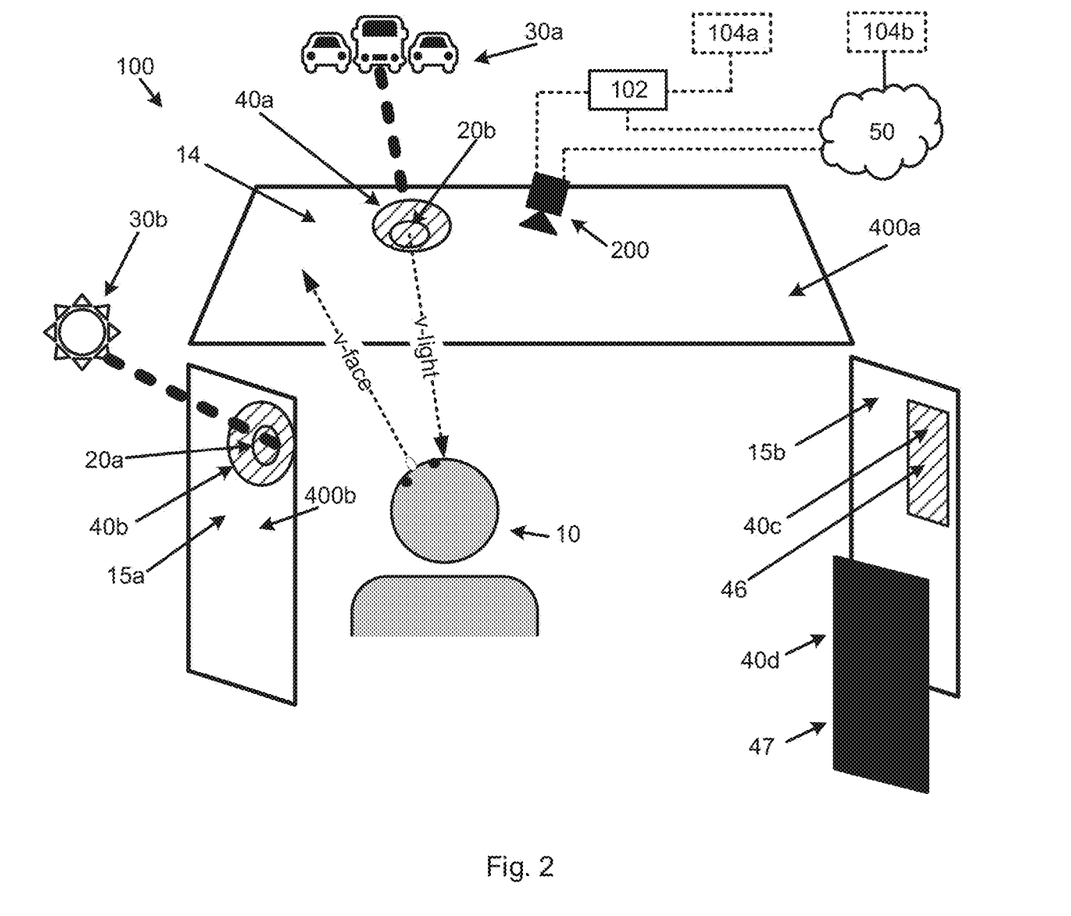
FIG. 2 illustrates a glare prevention system for implementing the proposed method according to an aspect of the disclosure.

The disclosure proposes a glare prevention system for a vehicle that is illustrated in FIG. 2. For illustrative purpose the vehicle is a car but the vehicle could also be a bus, truck, tractor, motorbike, boat, ship, aero plane, helicopter etc.

The glare prevention system comprising a camera 200 arranged to provide an image view iv of a vehicle occupant 10. According to an aspect the camera 200 is installed in the vehicle facing the vehicle occupant 10. According to an aspect the camera 200 is a camera of a portable electronic device that can be placed at a certain location in order to provide an image view iv of the vehicle occupant. According to an aspect the image view iv is represented by image data provided by the camera 200. The vehicle occupant 10 could be any person that is in the vehicle, for example the driver of the vehicle. The vehicle occupant 10 can also be a passenger.

The glare prevention system further comprise a glare protector 40a, 40b, 40c, 40d, . . . , 40n arranged to at least dampen light from a light source 30a, 30b so that the vehicle occupant 10 is less disturbed. According to an aspect the glare protector 40a, 40b, 40c, 40d, . . . , 40n is at least any of a smart window 400a, 400b with light blocking segments 45a, 45b, 45c . . . 45n, a movable curtain 46 or a movable cover element 47. According to an aspect all windows of the vehicle can be equipped with a glare protector 40a, 40b, 40c, 40d, . . . , 40n. In the aspect illustrated in the FIG. 2 the windscreen 14 and the left side window 15a are equipped with glare protectors 40a, 40b in form of smart windows 400a, 400b. The right side window 15b in FIG. 2 is equipped with two glare protectors 40c, 40d in the form of a movable curtain 46 and a movable cover element 47 in form of a light blocking window shutter.

Figure 3:
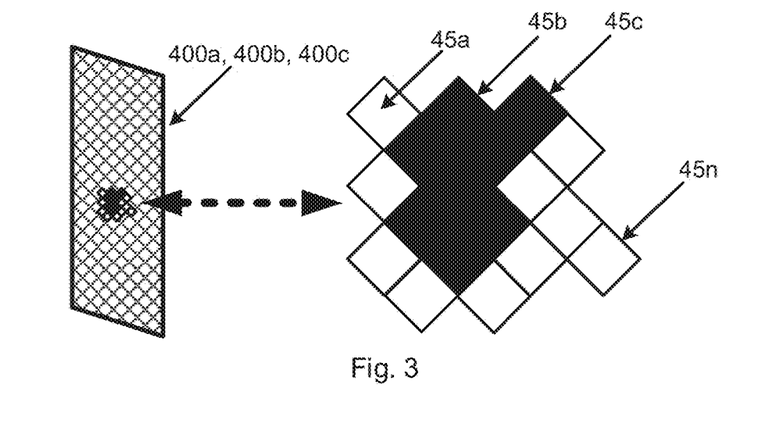
FIG. 3 illustrates a an exemplary image view of a smart window with light blocking segments according to an aspect of the disclosure.

The According to an aspect the glare protector 40a, 40b is a smart window 400a, 400b. The smart window 400a, 400b is equipped with light blocking segments 45a, 45b, 45c . . . 45n that can be used to control the amount of light that is allowed to pass through the smart window 400a, 400b. A smart window 400a, 400b is illustrated in FIG. 3. In particular FIG. 3 is magnifying a part of the smart window 400a, 400b to illustrate the light blocking segments 45a, 45b, 45c . . . 45n. In FIG. 3 light blocking segments 45a, 45b, 45c . . . 45n are either black or white, but according to an aspect the light blocking segments 45a, 45b, 45c . . . 45n are dimmable so that they can gradually turn from fully transparent to fully block light. The light blocking segments 45a, 45b, 45c, . . . , 45n can be controlled and dynamically activated in the smart window 400a, 400b. The light blocking segments 45a, 45b, 45c . . . 45n can be maintained activated in a certain area that is a part of the smart window 400a, 400b with constant electricity applied or shift state by applying electricity and keep that state without constant electricity applied. According to an aspect the light blocking segments 45a, 45b, 45c . . . 45n can be of different size and activated one by one or in a group of light blocking segments 45a, 45b, 45c . . . 45n. The glass of the smart window 400a, 400b can also be referred to as a "smart glass", or "dimmable glass", or "electrochromic glass" with the effect of providing a damping, shadowing or blocking light.

The glare protector 40a, 40b, 40c, 40d, . . . , 40n can be any object that is arranged to dampen or block light. This means that the glare protector 40a, 40b, 40c, 40d, . . . , 40n can be pure electric, electro-mechanic, or mechanic depending on the best suitable design for the vehicle in question and depending on any existing apparatus in the vehicle that can be used by the glare prevention system 100. According to an aspect the glare protector 40a, 40b, 40c, 40d is a movable metal rooftop or a tinted window, or an external sunshade curtain that already exists on the vehicle.

The system further comprising a processing circuitry 102, connected to the camera 200 and the glare protector 40a, 40b, 40c, 40d, . . . , 40n. The processing circuitry 102 can be a Central Processing Unit, CPU, or any processing unit carrying out instructions of a computer program or operating system. According to an aspect the a processing circuitry 102 is connected to the camera and the glare protector 40a, 40b, 40c, 40d, . . . , 40n via a local wired or wireless communication. According to an aspect the processing circuitry 102 is connected to the camera and the glare protector 40a, 40b, 40c, 40d, . . . , 40n via a communication network 50. In one example the communication network 50 is a standardized wireless local area network such as a Wireless Local Area Network, WLAN, Bluetooth™, ZigBee, Ultra-Wideband, Near Field Communication, NFC, Radio Frequency Identification, RFID, or similar network. In one example the communication network 50 is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. The communication network 50 can also be a combination of both a local area network and a wide area network. The communication network 50 can also be a wired network. According to some aspects of the disclosure the communication network 50 is defined by common Internet Protocols. In other words the processing carried out by the a processing circuitry 102 can either be local or in a remote node.

The processing circuitry 102 is configured to cause the glare prevention system 100 to provide an image view iv of the face of the vehicle occupant 10. According to an aspect the image view iv is represented by image data that can be processed by the processing circuitry 102.

Figure 4:
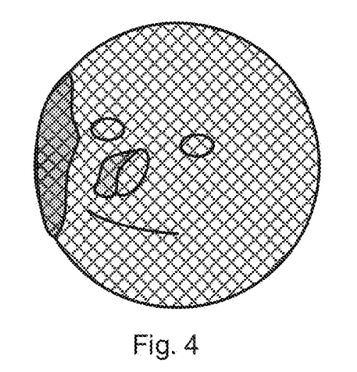
FIG. 4 illustrates an exemplary image view of different levels of light at plural parts of a face of the vehicle occupant according to an aspect of the disclosure.
Figure 5A:
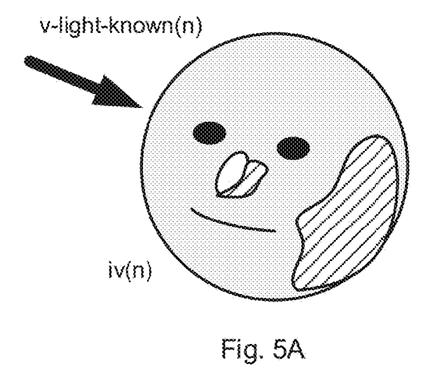
FIGS. 5A-5D illustrates pre-stored image views according to an aspect of the disclosure.
Figure 5B:
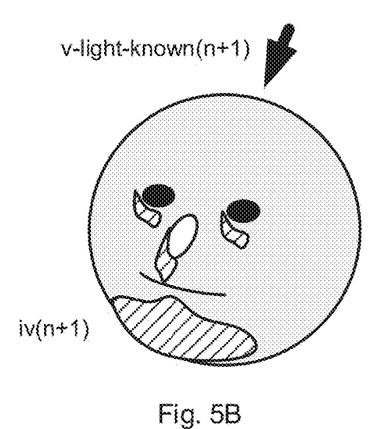
Figure 5C:
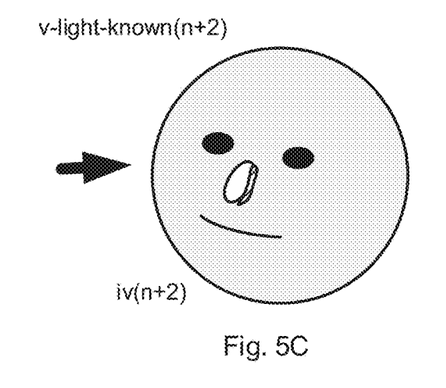
Figure 5D:
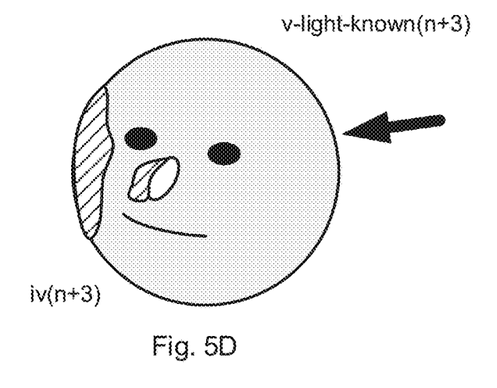

The processing circuitry 102 is further configured to cause the glare prevention system 100 to determine, based on the image view iv, different levels of light at plural parts of the face of the vehicle occupant 10. According to an aspect, the image data of the image view is processed by the processing circuitry 102 for identifying different levels of light at plural parts of the face. FIG. 4 illustrates an example of a face of a vehicle occupant. The square pattern in FIG. 4 illustrates plural parts of the face of the vehicle occupant 10. According to an aspect the level of light at different parts of the face of the vehicle occupant 10 is detected by a light sensor in the camera 200. The camera 200 captures the light in the face of the vehicle occupant 10 and convert it into electrical signals and this information can be processed by the processing circuitry 102. Each part has a certain level of light. In the illustration in FIG. 4 the right cheek and the area to the right of the nose of the vehicle occupant 10 is darker compared to other parts of the face.

The processing circuitry 102 is further configured to cause the glare prevention system 100 to determine a direction v-light between the face and the light source 30*a*, 30*b* causing the different levels of light at the plural parts of the face of the vehicle occupant 10. In an example as illustrated in FIG. 2 the direction v-light between the face and the light source 30*a*, exemplified by the headlights of opposing traffic, is illustrated with an arrow "v-light".

The processing circuitry 102 is further configured to cause the glare prevention system 100 to determine an area 20*a*, 20*b* where to activate the glare protector 40*a*, 40*b*, 40*c*, 40*d*, . . . , 40*n* and then activate the glare protector 40*a*, 40*b*, 40*c*, 40*d*, . . . , 40*n* in the determined area 20*a*, 20*b* to protect the vehicle occupant from glare caused by the light source 30*a*, 30*b*. According to an aspect the area 20*a*, 20*b* where to activate the glare protector has a centre that is along the axis of the vector defined by the direction v-light between the face and the light source 30*a*, 30*b*. According to an aspect the size of the area 20*a*, 20*b* is determined by the different levels of light at plural parts of the face of the vehicle occupant 10 that the glare protector 40*a*, 40*b*, 40*c*, 40*d*, . . . , 40*n* is causing after being activated. In particular, if the eyes of the vehicle occupant 10 is shadowed after activating the glare protector 40*a*, 40*b*, 40*c*, 40*d*, . . . , 40*n* the size is sufficient. According to an aspect the size of the area 20*a*, 20*b* is dynamically changed to protect the vehicle occupant from glare caused by the light source 30*a*, 30*b*. According to an aspect the size of the area 20*a*, 20*b* has a predefined shape such as a square, ellipse or circle. The area 20*a*, 20*b* where to activate the glare protector 40*a*, 40*b* is illustrated in FIG. 2. According to an aspect the size of the glare protector 40*a*, 40*b* is larger than the area 20*a*, 20*b* to minimize the risk of getting blinded by the glare caused by the light source 30*a*, 30*b*. In illustration in FIG. 2 the size of the glare protector 40*a*, 40*b* is larger than the area 20*a*, 20*b*.

In FIG. 2 the glare protectors 40*a* and 40*b* are in the form of smart windows 400*a*, 400*b*. The shape of the glare protectors 40*a* and 40*b* can hence have different shape. According to an aspect the glare protectors 40*a* and 40*b* are elliptical, circular or rectangular. According to an aspect the glare protector 40*a* of the windscreen 14 is in the form of a smart window 400*a* and the shape of the protector 40*a* has a shape of a traditional glare shield. According to an aspect the glare protector 40*a*, 40*b*, 40*c*, 40*d*, . . . , 40*n* is moving from top to down when activated until the vehicle occupant 10 is protected from glare caused by the light source 30*a*, 30*b*.

An advantage with the system is that an occupant of a vehicle, e.g. an operator or a driver of a car, can avoid getting disturbed by glare and this results in a much comfortable, and safe, driving experience.

According to an aspect the processing circuitry 102 is further configured to cause the glare prevention system 100 to determine, based on the image view iv, a direction of the face v-face of the vehicle occupant 10 in relation to the position of the camera 200. The knowledge of the direction of the face v-face of the vehicle occupant 10 in relation to the position of the camera 200 is used when determining the area 20*a*, 20*b* where to activate the glare protector 40*a*, 40*b*, 40*c*, 40*d*, . . . , 40*n*. According to an aspect the position of the camera 200 is static in relation to the glare protector 40*a*, 40*b*, 40*c*, 40*d*, . . . , 40*n* and hence the direction of the face v-face of the vehicle occupant 10 in relation to the position of the camera 200 is used when determining the area 20*a*, 20*b* where to activate the glare protector.

According to an aspect, determining the direction v-light between the face and the light source 30*a*, 30*b* comprising comparing the image view iv of the face of the vehicle occupant 10 with at least one pre-stored image view iv(n), iv(n+1), iv(n+2), iv(n+3), iv(n+m), wherein the at least one pre-stored image view iv(n), iv(n+1), iv(n+2), iv(n+3), iv(n+m) being associated with a known direction v-light-known(n), v-light-known(n+1), v-light-known(n+2), v-light-known(n+3), . . . , v-light-known(n+m) to a known light source causing correlating levels of light at correlating plural parts of a face in the at least one pre-stored image view iv(n), iv(n+1), iv(n+2), iv(n+3), iv(n+m) as the light source 30*a*, 30*b* is causing to the face of the vehicle occupant 10 in the image view iv, and assigning the same direction to be the direction v-light to the light source 30*a*, 30*b*. According to an aspect the known direction v-light-known(n), v-light-known(n+1), v-light-known(n+2), v-light-known(n+3), . . . , v-light-known(n+m) is represented by direction data that can be processed by the processing circuitry 102. According to an aspect the correlation can be pre-set or adjusted to allow a certain correlation, or a certain probability, that a certain pre-stored image view iv(n), iv(n+1), iv(n+2), iv(n+3), iv(n+m) is correlated to the image view iv.

According to an aspect the pre-stored image views iv(n), iv(n+1), iv(n+2), iv(n+3), iv(n+m), each associated with a known direction v-light-known(n), v-light-known(n+1), v-light-known(n+2), v-light-known(n+3), . . . , v-light-known(n+m), are stored in a memory 104*a*, 104*b* accessible by the processing circuitry 102. According to an aspect the memory 104*a* is a local memory that is in the vehicle. According to an aspect the memory is a remote memory 104*b* accessible via the communication network 50. In other words, processing of image data and direction data can be carried out at a remote location.

The direction v-light between the face and the light source 30 can hence be determined by utilizing the already existing direction data that is associated with the pre-stored image view iv(n), iv(n+1), iv(n+2), iv(n+3), iv(n+m) that has similar, or correlating parts, of the face with the correlating levels of lights, e.g. the same shadow effects, as the image view of the vehicle occupant 10.

According to an aspect each pre-stored image view iv(n), iv(n+1), iv(n+2), iv(n+3), iv(n+m) is associated with different levels of light at plural parts of the face of the vehicle occupant 10. FIGS. 5A-5D illustrates different pre-stored image views iv(n), iv(n+1), iv(n+2), iv(n+3), iv(n+m) each having different levels of light at plural parts of the face. The different levels of light at plural parts of the face is caused by light from a certain direction. The position of the light source defines the direction v-light between the face and the light source. With the knowledge of a certain known shadow effect of a face caused by a light source at a certain known position, the direction v-light between the face and the light source can be associated with that that image view of the face. Hence, at least one pre-stored image view iv(n), iv(n+1), iv(n+2), iv(n+3), iv(n+m) associated with a known direction v-light-known(n), v-light-known(n+1), v-light-known(n+2), v-light-known(n+3), . . . , v-light-known(n+m) to a known light source that is causing correlating levels of light at correlating plural parts of a face in the at least one pre-stored image view iv(n), iv(n+1), iv(n+2), iv(n+3), iv(n+m) as the light source 30a, 30b is causing to the face of the vehicle occupant 10 in the image view iv is used for determining the direction v-light to the light source 30a, 30b.

FIGS. 5A-5D illustrates different pre-stored image views iv(n), iv(n+1), iv(n+2), iv(n+3), iv(n+m) each having different levels of light at plural parts of the face and each image view is associated with a known direction v-light-known(n), v-light-known(n+1), v-light-known(n+2), v-light-known(n+3), . . . , v-light-known(n+m) to a known light source. In FIGS. 5A-5D the arrows illustrates the known direction for each image view.

According to an aspect the pre-stored image views iv(n), iv(n+1), iv(n+2), iv(n+3), iv(n+m) are digital three dimensional computer generated images. According to an aspect there are an infinite number of image views iv(n), iv(n+1), iv(n+2), iv(n+3), iv(n+m), each generated by a computer program. According to an aspect at least one pre-stored image view iv(n), iv(n+1), iv(n+2), iv(n+3), iv(n+m) comprising a three dimensional image of a face having correlating levels of light at the correlating plural parts of the face as the face of the vehicle occupant 10 in the image view iv. An advantage with using a three dimensional image of a face is that the processing of the image view by the processing circuitry 102 can be more efficient.

According to an aspect the at least one pre-stored image view iv(n), iv(n+1), iv(n+2), iv(n+3), iv(n+m) comprising a three dimensional image of the face of the vehicle occupant 10 having correlating levels of light at the correlating plural parts of the face as the face of the vehicle occupant 10 in the image view iv. This means that a more precise face data of the specific vehicle occupant 10 can be used for a better determination of the area 20a, 20b where to activate the glare protector 40a, 40b, 40c, 40d, . . . , 40n. According to an aspect the pre-stored image view iv(n), iv(n+1), iv(n+2), iv(n+3), iv(n+m) comprising a three dimensional image of the face of the vehicle occupant 10 generated by the camera 200 during set up phase and stored in the memory 104a, 104b accessible by the processing circuitry 102.

In one example a certain vehicle occupant 10 can have a personal digital profile or account with pre-stored image views iv(n), iv(n+1), iv(n+2), iv(n+3), iv(n+m) of the vehicle occupant 10 that can be accessible by the processing circuitry 102.

The information about the direction v-light between the face and the light source 30a, 30b is used when determining the area 20a, 20b where to activate the glare protector 40a, 40b, 40c, 40d, . . . , 40n.

According to an aspect the direction of the face v-face of the vehicle occupant is defined by a three dimensional vector that is perpendicular to a two dimensional plane that is connecting the eyes and the chin of the vehicle occupant. An advantage with defining the direction of the face v-face in this way is that it is easy for a camera to detect the eyes and the chin of a human and also that the line of sight for most humans is within the viewing angle around this vector.

According to an aspect the direction of the face v-face of the vehicle occupant is determined in relation to the position of the camera 200 and/or the at least one glare protector 40a, 40b, 40c, 40d, . . . , 40n. An advantage with knowing the direction of the face v-face of the vehicle occupant in relation to the camera 200 and/or the at least one glare protector 40a, 40b, 40c, 40d, . . . , 40n is that the camera 200 and/or the at least one glare protector 40a, 40b, 40c, 40d, . . . , 40n are/is mounted in the vehicle and hence static.

According to an aspect the direction to the light source v-light is relative to the direction of the face v-face of the vehicle occupant. The knowledge of this relation is useful information that can be processed by the processing circuitry 102 when determining the area 20a, 20b where to activate the glare protector 40a, 40b, 40c, 40d, . . . , 40n.

According to an aspect the area 20a, 20b where to provide the glare protector 40a, 40b, 40c, 40d, . . . , 40n to protect the vehicle occupant from glare caused by a light source 30a, 30b, is determined by using the direction v-light to the light source 30a, 30b and the direction of the face v-face of the vehicle occupant 10 in relation to the position of the camera 200. The knowledge of these relations can be used for better determination of the area 20a, 20b where to activate the glare protector 40a, 40b, 40c, 40d, . . . , 40n.

Figure 7:
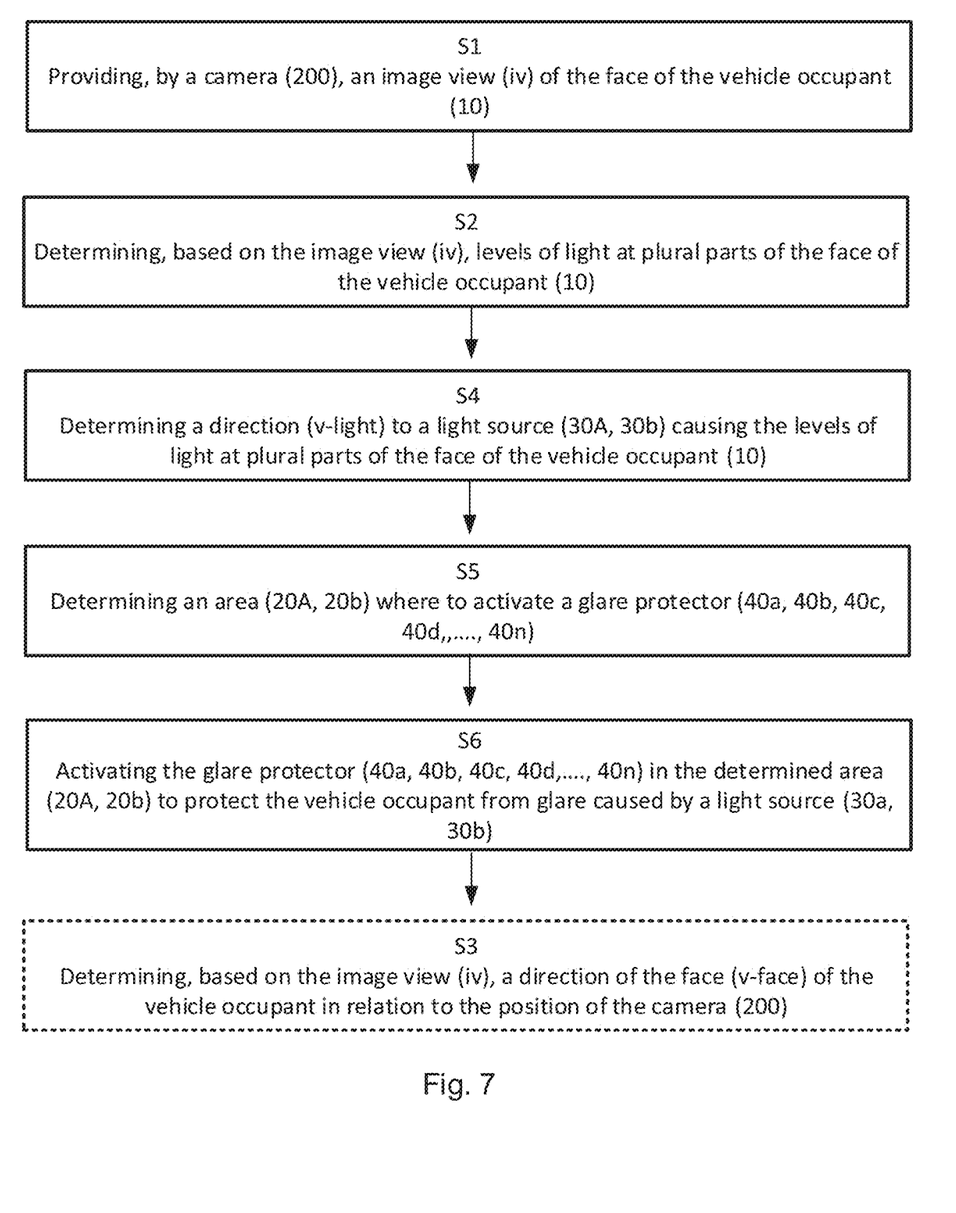
FIG. 7 illustrates a flow chart of the method steps according to the disclosure.

With reference to FIG. 7 the disclosure further proposes a method for protecting a vehicle occupant 10 from glare caused by a light source 30a, 30b. The glare prevention system 100 is adapted for carrying out the method. Aspects of the glare prevention system 100 described above can be carried out by the method described below.

The disclosure proposes a method for protecting a vehicle occupant 10 from glare caused by a light source 30a, 30b. The method comprising the steps of S1 providing, by a camera 200, an image view iv of the face of the vehicle occupant 10 and S2 determining, based on the image view iv, levels of light at plural parts of the face of the vehicle occupant 10. This is followed by the step S4 determining a direction v-light to a light source 30a, 30b causing the levels of light at plural parts of the face of the vehicle occupant 10 and S5 determining an area 20a, 20b where to activate a glare protector 40a, 40b, 40c, 40d, . . . , 40n, and then in the step S6 activating the glare protector 40a, 40b, 40c, 40d, . . . , 40n in the determined area 20a, 20b to protect the vehicle occupant 10 from glare caused by a light source 30a, 30b. An advantage with the system is that an occupant of a vehicle, e.g. an operator or a driver of a car, can avoid getting disturbed by glare and this results in a much comfortable, and safe, driving experience.

According to an aspect method further comprising the step S3 determining, based on the image view iv, a direction of the face v-face of the vehicle occupant 10 in relation to the position of the camera 200. The knowledge of the direction of the face v-face of the vehicle occupant 10 in relation to the position of the camera 200 is used when determining the area 20a, 20b where to activate the glare protector 40a, 40b, 40c, 40d, . . . , 40n. According to an aspect the determination of the area 20a, 20b is done continuously due to the movement of the vehicle, the movement of the vehicle occupant 10, and the movement of the light source 30a, 30b. According to an aspect the glare prevention system 100 is dynamic in constant operation in order to protect the vehicle occupant 10 from glare caused by a light source 30a, 30b. Hence, according to an aspect the area 20a, 20b where to activate the glare protector 40a, 40b, 40c, 40d, . . . , 40n is constantly changing.

According to an aspect, determining the direction v-light to a light source 30a, 30b is achieved by comparing the image view iv of the face of the vehicle occupant 10 with at least one pre-stored image view iv(n), iv(n+1), iv(n+2), iv(n+3), iv(n+m), wherein the at least one pre-stored image view iv(n), iv(n+1), iv(n+2), iv(n+3), iv(n+m) being associated with a known direction v-light-known(n), v-light-known(n+1), v-light-known(n+2), v-light-known(n+3), . . . , v-light-known(n+m) to a light source causing correlating levels of light at plural parts of a face in the at least one pre-stored image view iv(n), iv(n+1), iv(n+2), iv(n+3), iv(n+m) as the light source 30a, 30b is causing to the face of the vehicle occupant 10 in the image view iv, and assigning the same direction to be the direction v-light to the light source 30a, 30b. In other words, the direction v-light between the face and the light source 30 can be determined by utilizing the already existing direction data that is associated with the pre-stored image that has similar, or correlating parts, of the face with the correlating levels of lights, e.g. the same shadow effects, as the image view of the vehicle occupant 10. The information about the direction v-light between the face and the light source 30a, 30b is used when determining the area 20a, 20b where to activate the glare protector 40a, 40b, 40c, 40d, . . . , 40n.

Figure 6A:
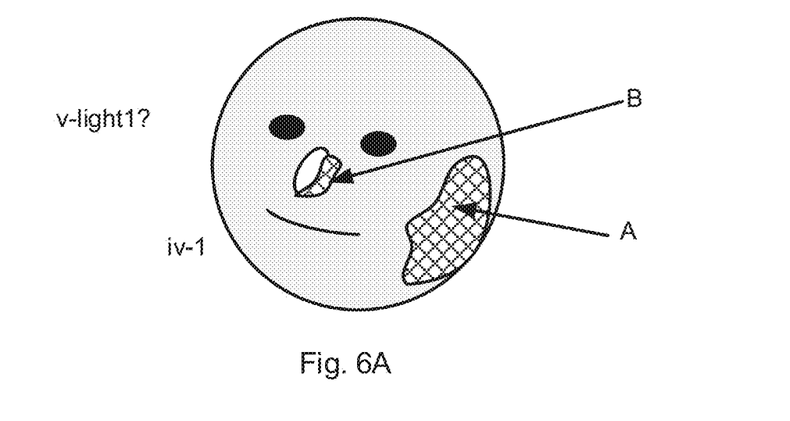
FIGS. 6A-6C illustrates determination of a direction between the face and the light source according to an aspect of the disclosure.
Figure 6B:
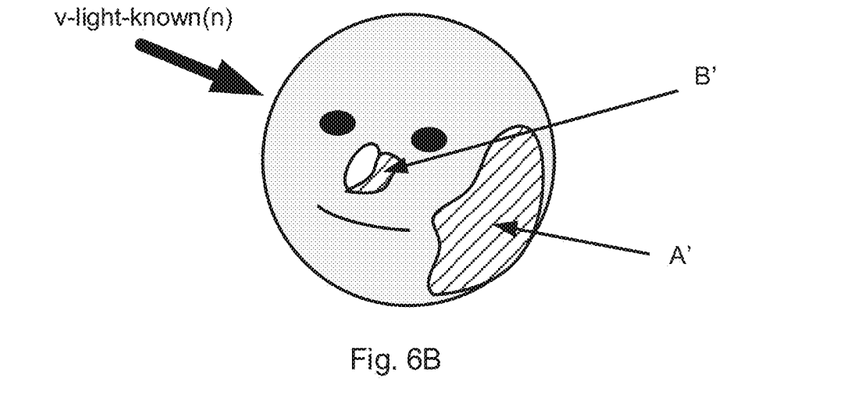
Figure 6C:
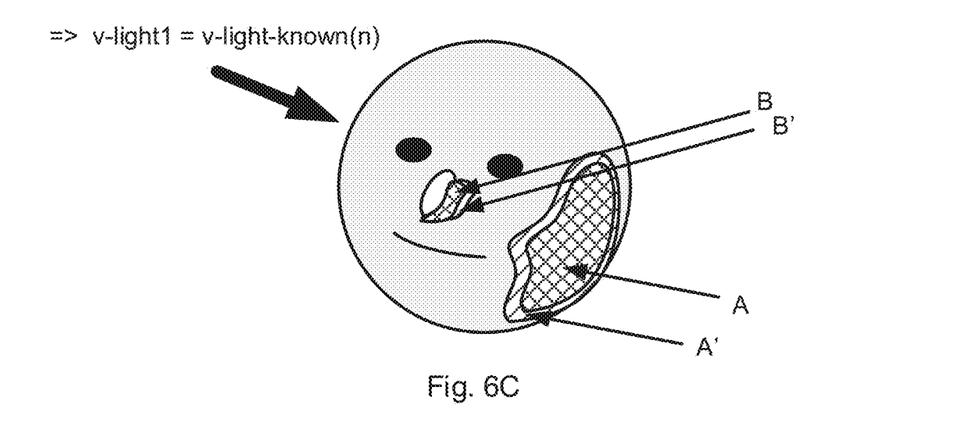

In FIGS. 6A-C it is illustrated how the direction v-light between the face and the light source 30a, 30b can be determined, according to an aspect.

FIG. 6A illustrates an image view of a face of a vehicle occupant, iv1, with an unknown direction, v-light1, between the face and the light source 30a, 30b. The face in FIG. 6A has different levels of light at plural parts of the face, in particular the shadowed areas A and B.

FIG. 6B illustrates a pre-stored image view iv(n) associated with a known direction v-light-known(n). The face in the pre-stored image view iv(n), illustrated in FIG. 6B, has correlating levels of light at plural parts of the face A', B' as the light source 30a, 30b is causing to the face A,B of the vehicle occupant 10 in the image view iv1, that is illustrated in FIG. 6A.

With the knowledge of the known direction v-light-known(n) and the correlation between the pre-stored image view iv(n) and the image view of a face of a vehicle occupant, iv1, the direction, v-light1, is assigned to be the same as for the pre-stored image view iv(n), namely v-light-known(n)=v-light1. Now, with the knowledge of v-light1, the glare prevention system 100 can determine an area 20a, 20b where to activate the glare protector 40a, 40b, 40c, 40d, . . . , 40n and then activate the glare protector 40a, 40b, 40c, 40d, . . . , 40n to protect the vehicle occupant from glare caused by the light source 30a, 30b.

The disclosure further proposes a computer program product comprising a non-transitory computer readable medium, having thereon a computer program comprising program instructions, the computer program being loadable into a data processing unit and configured to cause execution of the method when the computer program is run by the processing circuitry 102. This means that the method can be transferred or downloaded from the computer readable medium and used in plural devices and/or systems.

According to an aspect of the disclosure, the method is carried out by instructions in a software program that is downloaded and run in the glare prevention system 100. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A glare prevention system for a vehicle comprising:
   a camera arranged to provide an occupant image view, the occupant image view being of a face of a vehicle occupant;
   a glare protector arranged to dampen light from a light source so less light from the light source is incident on eyes of the vehicle occupant; and
   a processing circuitry, connected to the camera and the glare protector, the processing circuitry configured to:
      determine, based on the occupant image view provided by the camera, different levels of light at plural parts of the face of the vehicle occupant;
      determine a direction between the face and the light source causing the different levels of light at the plural parts of the face of the vehicle occupant by comparing the occupant image view with a plurality of pre-stored image views, wherein each pre-stored image view is associated with a known direction to a known light source that causes different light levels at plural parts of a face in the pre-stored image, so as to correlate the light levels in the occupant image view with corresponding light levels in one of the pre-stored image views;
      assign the known direction of the correlated pre-stored image to be the direction of the vehicle occupant to the light source;
      determine an area of the glare protector to activate; and
      activate the glare protector in the determined area to protect the vehicle occupant from glare caused by the light source.

2. The glare prevention system according to claim 1, wherein the processing circuitry is further configured to cause the glare prevention system to:
   determine, based on the occupant image view, a direction of the face of the vehicle occupant in relation to the position of the camera.

3. The glare prevention system according to claim 1, wherein the glare protector is one of:
   a smart window with light blocking segments;
   a movable curtain; or
   a movable cover element.

4. The glare prevention system according to claim 1, wherein the direction of the face of the vehicle occupant is defined by a three dimensional vector that is perpendicular to a two dimensional plane that connects the eyes and the chin of the vehicle occupant.

5. The glare prevention system according to claim 1, wherein the direction of the face of the vehicle occupant is determined in relation to the position of the camera and/or the at least one glare protector.

6. The glare prevention system according to claim 1, wherein the level of light at different parts of the face of the vehicle occupant is detected by a light sensor in the camera.

7. The glare prevention system according to claim 1, wherein in the direction to the light source is relative to the direction of the face of the vehicle occupant.

8. The glare prevention system according to claim 1, wherein the area where to provide the glare protector to protect the vehicle occupant from glare caused by a light source, is determined by using the direction to the light source and the direction of the face of the vehicle occupant in relation to the position of the camera.

9. A method for protecting a vehicle occupant from glare caused by a light source, the method comprising:
- providing, by a camera, an occupant image view, the occupant image view being of the face of the vehicle occupant;
- determining, based on the occupant image view, different levels of light at plural parts of the face of the vehicle occupant;
- determining a direction of the face to a light source causing the different levels of light at the plural parts of the face of the vehicle occupant by comparing the occupant image view with a plurality of pre-stored image views, wherein each pre-stored image view is associated with a known direction to a known light source that causes different light levels at plural parts of a face in the pre-stored image, so as to correlate the light levels in the occupant image view with corresponding light levels in one of the pre-stored image views;
- assigning the known direction of the correlated pre-stored image to be the direction of the vehicle occupant to the light source;
- determining an area of a glare protector to activate; and
- activating the glare protector in the determined area to protect the vehicle occupant from glare caused by a light source.

10. The method according to claim 9 further comprising, determining, based on the occupant image view, a direction of the face of the vehicle occupant in relation to the position of the camera.

11. A non-transitory computer readable medium, having stored thereon a computer program comprising program instructions, the computer program being loadable into a data processing unit and configured to cause execution of the method according to claim 9 when the computer program is run by the data processing unit.

* * * * *